United States Patent [19]

Naito

[11] Patent Number: 5,025,432
[45] Date of Patent: Jun. 18, 1991

[54] AUTOCHANGER OF WRITABLE DISCS INCLUDING A NON-VOLATILE MEMORY FOR STORING MOST RECENT DEFECT MANAGEMENT INFORMATION RELATING TO THE WRITABLE DISCS

[75] Inventor: Ryuichi Naito, Saitama, Japan

[73] Assignee: Pioneer Electronic Corporation, Tokyo, Japan

[21] Appl. No.: 243,961

[22] Filed: Sep. 14, 1988

[30] Foreign Application Priority Data

Sep. 14, 1987 [JP] Japan .............................. 62-230195

[51] Int. Cl.$^5$ .............................................. G11B 17/22
[52] U.S. Cl. ...................................... 369/36; 369/34; 369/85
[58] Field of Search ................. 369/14, 15, 36, 84, 369/85, 34

[56] References Cited

U.S. PATENT DOCUMENTS

| | | | |
|---|---|---|---|
| 3,990,710 | 11/1976 | Hughes | 369/85 X |
| 4,108,365 | 8/1978 | Hughes | 369/85 X |
| 4,504,878 | 3/1985 | Gutmann | 369/36 |
| 4,538,253 | 8/1985 | Ishibashi et al. | 369/36 X |
| 4,607,354 | 8/1986 | Ishibashi et al. | 369/39 |
| 4,608,679 | 8/1986 | Rudy et al. | 369/36 |
| 4,631,723 | 12/1986 | Rathbun et al. | 371/10 |
| 4,703,465 | 10/1987 | Parker | 369/85 X |
| 4,723,181 | 2/1988 | Hickok | 369/15 X |
| 4,746,998 | 5/1988 | Robinson et al. | 360/72.1 |
| 4,787,074 | 11/1988 | Deck et al. | 369/36 |
| 4,815,056 | 3/1989 | Toi et al. | 369/36 |
| 4,823,333 | 4/1989 | Satoh et al. | 369/84 |

FOREIGN PATENT DOCUMENTS 0172552 10/1982 Japan ........................................ 369/84

OTHER PUBLICATIONS

J. A. de Vos, "Megadoc, a Modular System for Electronic Document Handling", *Phillips Technical Review*, vol. 39, No. 12, 1980.

*Primary Examiner*—Benjamin R. Fuller
*Assistant Examiner*—Randy W. Gibson
*Attorney, Agent, or Firm*—Sughrue, Mion, Zinn, Macpeak and Seas

[57] ABSTRACT

An autochanger of writable discs automatically transfers a write-once optical disc between a disc accommodation unit and a recording/reading device where data is recorded into and read from the optical disc. In order to shorten a disc loading time, the latest defect management information is stored in a floppy disc and renewed when a new defective sector is found in the optical disc.

8 Claims, 2 Drawing Sheets

| CONTROL TRACKS | TRACK NUMBER | | | |
|---|---|---|---|---|
| MAP AREA #1 | 1 | ~ | 4 | (4 TRACKS) |
| MAP AREA #2 | 5 | ~ | 8 | (4 TRACKS) |
| ⋮ | | | | |
| MAP AREA #62 | 245 | ~ | 248 | (4) |
| MAP AREA #63 | 249 | ~ | 252 | (4) |
| USER AREA #1 | 253 | ~ | 566 | (314) |
| REPLACEMENT AREA #1 | 567 | ~ | 570 | (4) |
| USER AREA #2 | 571 | ~ | 884 | (314) |
| REPLACEMENT AREA #2 | 885 | ~ | 888 | (4) |
| ⋮ | | | | |
| USER AREA #61 | 19333 | ~ | 19646 | (314) |
| REPLACEMENT AREA #61 | 19647 | ~ | 19650 | (4) |
| USER AREA #62 | 19651 | ~ | 19992 | (342) |
| REPLACEMENT AREA #62 | 19993 | ~ | 19996 | (4) |
| REPLACEMENT AREA #63 | 19997 | ~ | 20000 | (4) |

AUTOCHANGER OF WRITABLE DISCS INCLUDING A NON-VOLATILE MEMORY FOR STORING MOST RECENT DEFECT MANAGEMENT INFORMATION RELATING TO THE WRITABLE DISCS

BACKGROUND OF THE INVENTION

The present invention relates to an autochanger of writable discs.

FIG. 4 shows a conventional autochanger of writable discs. In this figure, a writable disc of, for example, a write-once type optical disc 1 is a large capacity disc medium having a storage capacity of several hundred mega-bytes to several giga-bytes per one disc and several discs to several hundred discs are accommodated in order in a disc accommodation unit 2. In the predetermined area of the optical disc 1, defect management information showing addresses of defective sectors in the optical disc 1 and addresses of replacement sectors for the defective sectors is recorded. A loading mechanism 3 automatically picks up the predetermined optical disc contained in the disc accommodation unit 2 and transfers the picked-up optical disc to apply it to a recording/reading device 4, automatically removes the optical disc from the recording/reading apparatus 4 and returns it to the disc accommodation unit 2. The recording/reading device 4 records information into the optical disc installed in the recording/reading device 4 by means of the loading mechanism 3 and reads the information recorded on the optical disc. A plurality of the recording/reading devices 4 may be used in the autochanger.

A controller 5 consists of a microcomputer and performs such operations according to commands supplied from a host computer 6 through an interface 7 (SCSI or the like) as: controlling the loading mechanism 3 so as to load the suitable optical disc from the disc accommodation unit 2 to the recording/reading device 4, controlling the recording/reading device 4 so as to record the information supplied from the host computer 6, and reversely controlling the recording/reading device 4 so that the recorded information is read out from the optical disc and transferred to the host computer 6. The controller 5 contains a RAM (random access memory) for storing defect management information of the optical disc.

When a new optical disc has been installed in the recording/reading device 4 in response to the commands sent from the host computer 6, the controller 5 instructs the recording/reading device 4 so as to read the defect management information recorded in the predetermined area of the optical disc and writes the read defect management information into the RAM 8 in the controller 5. After that, when the controller 5 receives the command sent from the host computer 6 to read the information recorded in the optical disc, the controller 5 judges from the defect management information in the RAM 8 whether the designated sectors are replaced by other sectors through the occurrence of defective sectors and gives the recording/reading device 4 an instruction to read suitable sectors. If a defective sector is detected when the writing operation is carried out according to the writing command, the controller 5 rewrites the information to a suitable replacement sector on the basis of the defect management information stored in the RAM 8, writes new defect management information into a suitable sector, and simultaneously renews the data in the RAM 8 to the latest defect management information.

As described above, in the conventional autochanger it is necessary to read the defect management information from the optical disc every time the disc is installed into the recording/reading device 4. Therefore, it takes additional time corresponding to reading the defect management information to install the optical disc. The reason for necessitating the extra time to read out the defect management information will be described in the following.

FIG. 5 is an explanatory diagram of an example of a defect management method for a write-once type optical disc with a diameter of 130 mm. There are 20,000 tracks (track numbers are 1 to 20,000) in the disc and these tracks are used for a map area, a user area, or a replacement area. One track consists of 32 sectors and each sector has a capacity of 512 bytes.

The user area is originally used by the user to write data into it and read data out of it. The replacement area is used to rewrite the data of the sector which is judged as a defective sector in verification reading performed immediately after the data has been written into the user area. A defective sector means a sector which has micro-defects, so that the data previously written can not be read out with a prescribed signal quality. The map area is used to write the defect management information which indicates the correspondence between the defective sectors in the user area and the replacement sectors in the replacement area.

The disc memory area can be divided into a plurality of bands consisting of at most 63 bands. Basically, each band has a map area, a replacement area and a user area. However, as described below, there exists a band which does not have a user area. The map area and the replacement area of each band are determined to have four tracks (128 sectors), respectively, but the number of tracks in each user area is not fixed. Also there is not determined the position of the first track of each area of each band. The number of tracks in each user area and the positions of the first tracks may be designated by the user or by the controller automatically. In order to memorize the above information, control tracks are provided with the fixed track numbers (except for 1 to 20,000) in the disc.

FIG. 5 shows an example of a format of the band division and the track numbers of each area of the disc memory area. As shown in FIG. 5, the disc memory area is divided into the bands of #1 to #63. The bands of #1 to #62 have respective user areas and the band #63 does not have a user area. Each user area of the bands #1 to #61 consists of 314 tracks and the user area of the band #62 has 342 tracks so as to adjust the fractions.

When data is written in a certain sector in the user area #1 and the sector is judged to be defective in the verification reading carried out just after the writing, the same data is again written into the sector with the smallest address number among non-written sectors in the replacement area #1. This replacement sector is also subjected to verification reading. When it is a defective sector, the data is again written into the next sector. In this manner, the same data is written into the sector in the replacement area #1 repeatedly until a sector without a defect is found in the verification reading. As a result, one sector in the replacement area #1 corresponds to one defective sector in the user area #1. One pair of corresponding addresses of these two sectors comprises one piece of defect management information and this information is written into the sector with the smallest address number among non-written sectors in the map area #1. This sector in the map area #1 is also subjected to the verification reading. When this sector is found to be a defective sector, the data is again written in the next sector. In this way, the same data (defective management information) is written in the map area #1 until a sector without a defect is found in the verification reading.

The same procedure is carried for the bands #2 to #62. The band #63 is provided for the case of overflowing in the map area or in the replacement area of the bands #1 to #62. Therefore, the band #63 does not have a user area.

Construction of the map area will be explained in the following. One sector (512 bytes) in the map area is divided into 128 fields, with each field having four bytes. Three bytes in one field show the defective sector address in the user area and the remaining one byte shows the specific sector of 128 sectors in the replacement area, by which specific sector the defective sector in the user area is replaced. Therefore, the one sector in the map area can contain at the maximum 128 pieces of defect management information and it is identical with the number of 128 sectors in the replacement area provided in one band, so that only one sector in the map area can contain all the defect management information of the corresponding band. When the data in a certain band are overflown, the band #63 as the common overflowing area is used to store the overflown data.

As data-rewriting cannot be performed in a write-once type optical disc, when one piece of defect management information is generated in a certain band, it is unavoidable to consume one sector in the map area, into which sector the defect management information is written. When the defective sector is found at the first time in a certain band, the data describing the defect management information is written into the first field (4 bytes) of the leading sector in the map area of that band. And when the next defective sector is found, the same data describing the first found defect management information is written into the first field of the second sector and the data describing the newly found defect management information is written into the second field of the second sector in the map area, since the data in the leading sector of the map area cannot be rewritten.

As is understood from the above explanation, the latest defect management information in a certain band exists in the last written sector in 128 sectors in the map area of that band. Needless to say, the latest defect management information is necessary when reading the data out of the user area. Moreover, when a new defective sector is found in writing the data; without the latest defect management information it is uncertain into which sector in the replacement area the data should be rewritten, and without the knowledge of the sector address in the map area storing the latest defect management information it is also uncertain into which sector in the map area the next defect management information should be written.

Therefore, the following operations are needed when a disc is loaded in the recording/reading device. Firstly, the control tracks in the disc are read to know the track numbers of the map area of each band. Secondly, the last-written sectors are found out for all map areas and the latest management information of each band is read out of that sector. Finally, the latest defect management information is written into the RAM.

Next, the time necessary to read the defect management information will be explained. If the rotation speed of the disc is 1,800 r.p.m., the time for one rotation of the disc is about 33 msec. Presuming that a considerable portion of the map area of each band has been consumed, it is hard to expect shortening the time by employing the process of finding the last-written sector in the map area of a certain band and immediately after that accessing to the map area in the next band. Eventually, there is no other way than reading all the map area of the disc according to the revolution of the disc. The total number of the tracks in the map areas is 252, so that 8.4 seconds are consumed to read all tracks in the map areas.

As in the autochanger for optical discs in which the discloading time is one of the most important performances, the operating speed of the disc-loading mechanism must be made higher. However, in accordance with the prior art, more than 8 seconds of time is necessary as described above to read the defect management information, resulting in the disadvantage of increasing the disc-loading time.

SUMMARY OF THE INVENTION

Accordingly, an object of the present invention is to provide an autochanger of writable discs which can greatly reduce the substantial disc-loading time.

An autochanger of writable discs according to the present invention comprises: a disc accommodation unit for accommodating in order a plurality of writable discs, in each disc being recorded defect management information which indicates an address of a defective sector in the disc and an address of a replacement sector for the defective sector by sequentially using sectors in predetermined areas; a recording/reading device for recording data into the disc and reading recorded data from the disc by accessing to prescribed addresses of the disc while referring to the latest defect management information; a loading mechanism for automatically transferring the disc between the disc accommodation unit and the recording/reading device; a controller for controlling the loading mechanism, the recording/reading device and an erasable non-volatile memory; and the erasable non-volatile memory; wherein in the process where the disc is applied to the accommodation unit at least the latest defect management information of the disc is stored in the non-volatile memory, and the latest defect management information is renewed with new defect management information which is generated in writing data into prescribed addresses of the disc.

Other and further objects, features and advantages of the invention will appear more fully from the following description taken in connection with the accompanying drawings.

DETAILED DESCRIPTION OF THE PREFERRED EMBODIMENTS

Embodiments of the present invention will be described with reference to the accompanying drawings.

Figure 1:
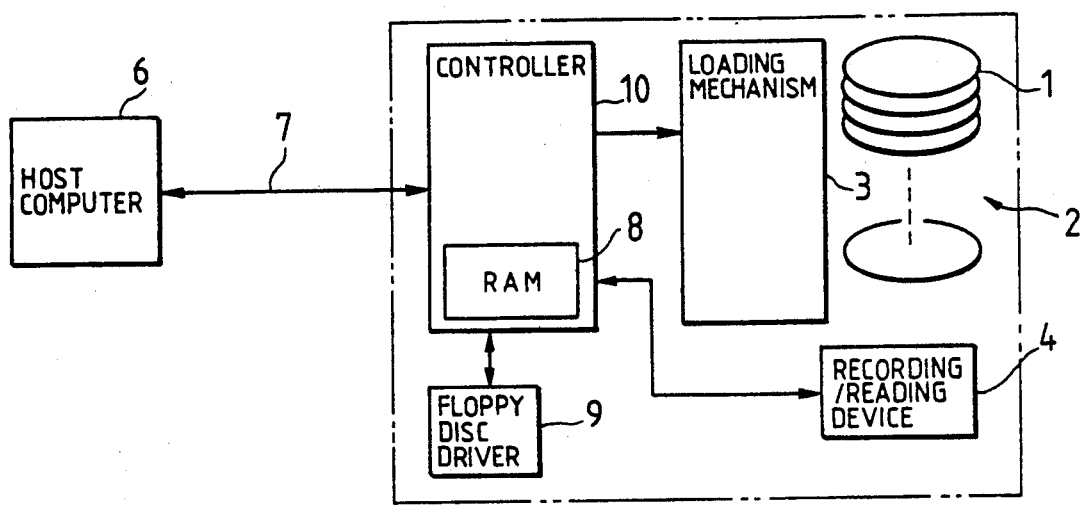
FIG. 1 is a block diagram showing an embodiment of the present invention.
Figures 4, 5:
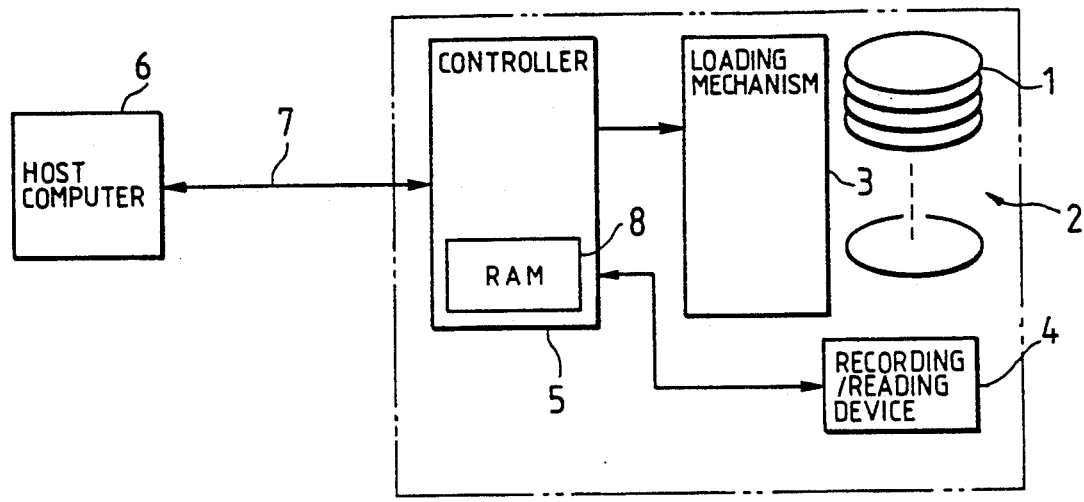
FIG. 4 is a block diagram showing a conventional disc autochanger.
FIG. 5 is a diagram depicting a format of band division of a disc memory area and track numbers in each area.

FIG. 1 is a block diagram showing one embodiment of an autochanger of writable discs according to the present invention. In FIG. 1, blocks or parts which are the same as those shown in FIG. 4 are identified by like reference numerals and redundant explanation will be omitted.

The autochanger shown in FIG. 1 is equipped with a driver means 9 for driving a non-volatile memory means into which new information can be rewritten (in other words, erasable), for example a floppy disc. A controller 10 also controls the floppy disc driver 9. The following data is stored on the floppy disc for each optical disc which is accommodated in the disc accommodation unit 2:

① latest defect management information written in the last written sector in the map area of every band (512 bytes × 63 bands = 32,256 bytes) and ② the address information of the last written sector among 128 sectors in the map area of every band (1 byte × 63 bands = 63 bytes). In total 32,319 bytes of data are stored.

Therefore, if the number of the optical discs contained in the disc accommodation unit 2 is, for example about 50, a floppy disc having a capacity of about 1.6 megabytes is necessary. If several hundreds optical discs are contained in the disc accommodation unit 2, a hard disc, instead of the floppy disc, may be used as the non-volatile memory means.

Figure 2:
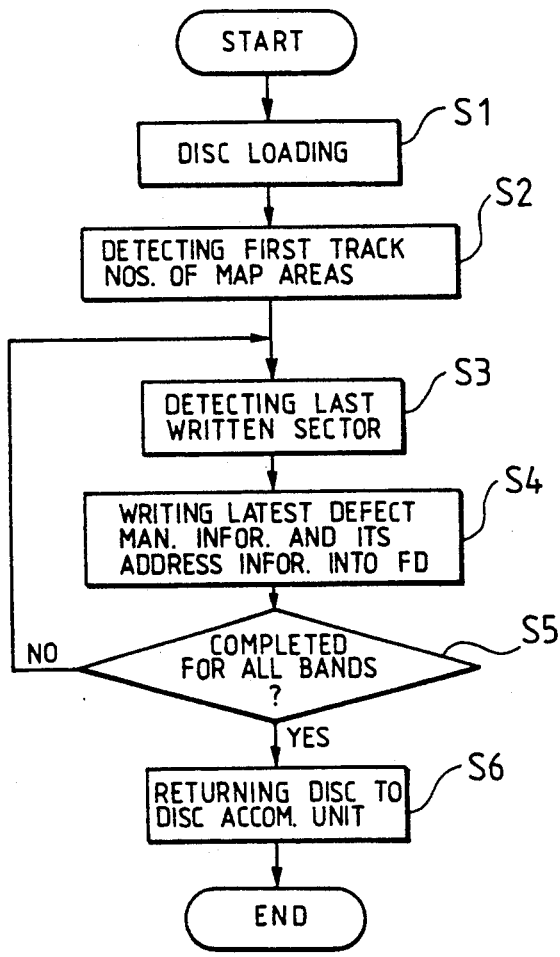
FIGS. 2 and 3 are flow charts depicting processing steps to be carried out by a processor of the controller shown in FIG. 1.
Figure 3:
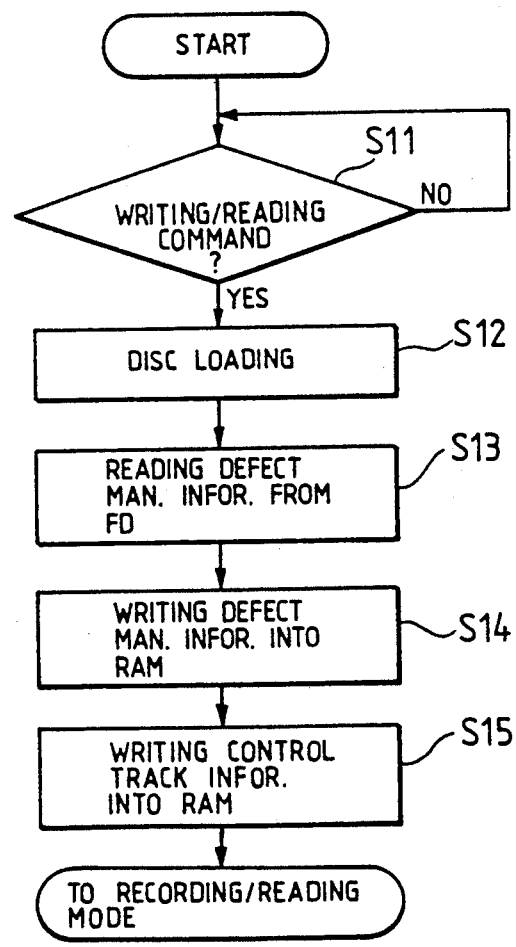

The processing steps to be carried out in the processor of the controller 10 of the autochanger which is provided with the floppy disc as the erasable non-volatile memory means and the floppy disc driver 9 will be explained with reference to the flow charts shown in FIGS. 2 and 3.

First, the processing steps for accommodating the optical disc into the disc accommodation unit 2 will be described with reference to FIG. 2. The processor controls the loading mechanism 3 in order to transfer the optical disc from the disc accommodation unit 2 into the recording/reading apparatus 4 (Step S1) and then controls the recording/reading apparatus 4 in order to read the information stored in the control tracks of the optical disc (Step S2). As a result of this procedure, the first track numbers of the map areas of all bands in the optical disc are known. Next, the processer controls the recording/reading device 4 in order to in turn read 128 sectors in the map area of a certain band (Step S3), thereby finding the last written sector. Then, the processor controls the floppy disc driver 9 in order to memorize into the floppy disc the latest defect management information stored in the last written sector and the address information indicating the position of the last written sector in the map area (Step S4). This step is carried out for all bands. After the Step S4 is found to be completed for all bands at Step S5, the optical disc is returned to the disc accommodation unit 2 at Step S6. It is needless to say that the steps mentioned above are necessary only when the optical disc is newly accommodated into the disc accommodation unit 2.

FIG. 1 does not show any means for designating the optical disc in the disc accommodation unit 2, for which disc the above steps are going to be carried out. For example, the operator may designate the optical disc manually by means of an input means, such as a push button. It is also possible to install a detecting means, for example a microswitch or the like, in the places of the disc accommodation unit 2 which contains the optical discs in order to automatically judge the optical disc to be executed.

Next, the processing steps shown in FIG. 3 for writing data into the optical disc or reading the stored data out of the optical disc will be explained. When the processor receives a command from the host computer 6 instructing to write the data into the designated optical disc or read the stored data out of the designated optical disc (Step S11), it controls the loading mechanism 3 to transfer the designated optical disc to the recording/reading device 4 (Step S12), controls the floppy disc driver 9 to read the defect management information with respect to the designated optical disc from the floppy disc (Step S13) and stores the read-out defect management information into the RAM 8 (Step S14).

As described above, the data volume stored in the floppy disc with respect to one optical disc is just about 32,000 bytes, so that it takes less than 1 second to read that data. On the other hand, the time necessary for the loading mechanism 3 to transfer the optical disc into the recording/reading device 4 is generally at least more than 1 second. In consequence, the time taken in reading the data out of the floppy disc can be ignored since it can be performed while the optical disc is transferred to the recording/reading device 4.

Next, the processor controls the recording/reading device 4 so as to read the information stored in the control tracks of the optical disc and to write the read-out information into the RAM 8 (Step S15). If there is some extra memory area in the floppy disc, it is possible to write the information in the control tracks as well into the floppy disc in the process of the accommodation of the optical disc into the disc accommodation unit 2. This means the elimination of the time for reading the control track information after the disc application into the recording/reading device 4.

As a result of completion of the foregoing processing steps the following information has been written into the RAM 8 of the controller 5 for all bands of the designated optical disc: the first track of every area, information indicating the correspondence of the sectors in the replacement areas to the replaced sectors in the user areas, and the address information of the last written sectors in the map areas. Because the data reading and the data writing after the completion of the above procedure can be carried out in the same manner as the conventional autochanger, it is possible to completely save the time of more than 8 seconds which was necessary to read the defect management information in the prior art.

Next, the case in which a defective sector is found when data is written into the user area will be explained. The operation of rewriting the data into the sector with the smallest address among the non-written sectors in the replacement area and the operation of additionally writing the resultant new defect management information into the sector next to the last written sector in the map area, are carried out in the same manner as the conventional method.

On the other hand, according to the present invention, in addition to the above operations the controller 10 controls the floppy disc driver 9 so as to renew such information in the floppy disc as the defect management information of the band into which the data has just been written and the address information of the last written sector in the map area of that band. This renewing operation is not carried out to all the bands, so that this operation completes in an instant. In this manner, the data in the floppy disc is always renewed to the latest defect management information, so that there is no need to carry out any special initialization steps after turning-on of the system.

Although the foregoing description has been made for the write-once type optical disc, the erasable-rewritable type optical disc may be used in the present invention. In the erasable-rewritable optical disc, as the data in the sector in the map area can be rewritten, theoretically the map area of one band can consist of only one sector, it is basically not necessary to search the last written sector. However, when the format interchangeability between the optical discs of write-once type and erasable-rewritable type is required, the advantage similar to that of the above embodiment can be obtained.

As described above, according to the present invention, at least the latest defect management information of the optical discs which are accommodated and arranged in the autochanger of writable discs is stored in the erasable type non-volatile memory means, and when the defective sector is found during the writing operation the latest defect management information stored in the erasable type non-volatile memory means is renewed. Therefore, the actual loading time of the disc can be greatly reduced. Because the latest defect management information is held in the non-volatile memory means as well as in the optical disc proper, it is possible to read the data stored in the optical disc even if the latest defect management information of the optical disc becomes impossible to be read-out. Moreover, as no special data are additively written into the optical disc, it is possible to obtain the changeability between two disc apparatuses with the same format of the optical disc.

What is claimed is:

1. An autochanger of writable discs, comprising:
 a plurality of writable discs for storing data, wherein each of said writable discs has user areas for storing said data, replacement areas for storing said data in place of a defective sector in said user area, and map areas for storing defect management information, said defect management information including addresses of defective sectors in said writable disc and addresses of replacement sectors corresponding to said defective sectors;
 a disc accommodation unit for accommodating, in order, said plurality of discs;
 a recording/reading device for recording said data into one of said writable discs which is currently in said recording/reading device and reading recorded data from said writable disc by accessing prescribed addresses of said writable disc while referring to latest defect management information stored in a memory;
 a loading mechanism for automatically transferring said writing discs between said disc accommodation unit and said recording/reading device;
 erasable non-volatile memory means, different from said writable discs and said memory, for non-volatile storage of said latest defect management information of each of said plurality of writable discs, said stored latest defect management information being renewed when a new defective sector is found; and
 a controller for controlling said loading mechanism, said recording/reading device, and said erasable non-volatile memory means, said controller including said memory in which said latest defect management information referred to by said recording/reading device is stored;
 wherein latest defect management information stored in said erasable non-volatile memory means corresponding to said writable disc currently in said recording/reading device is stored in said memory of said controller while said corresponding writable disc is in said recording/reading device.

2. An autochanger of writable discs as claimed in claim 1, wherein said memory of said controller is a RAM.

3. An autochanger of writable discs as claimed in claim 1, wherein said erasable non-volatile memory means stores said latest defect management information read from said writable disc in a process of newly accommodating each of said writable discs into said disc accommodation unit.

4. An autochanger of writable discs, comprising:
 a plurality of writable discs for storing data, wherein each of said writable discs has user areas for storing said data, replacement areas for storing said data in place of a defective sector in said user area, and map areas for storing defect management information, said defect management information including addresses of defective sectors in said writable disc and addresses of replacement sectors corresponding to said defective sectors;
 a disc accommodation unit for accommodating in order said plurality of discs;
 a recording/reading device for recording said data into one of said writable discs which is currently in said recording/reading device and reading recorded data from said writable disc by accessing prescribed addresses of said writable disc while referring to latest defect management information stored in a memory;
 a loading mechanism for automatically transferring said writing discs between said disc accommodation unit and said recording/reading device;
 erasable non-volatile memory means for storing said latest defect management information of each of said plurality of writable discs, said stored latest defect management information being renewed when a new defective sector is found; and
 a controller for controlling said loading mechanism, said recording/reading device, and said erasable non-volatile memory means, said controller including said memory in which said latest defect management information referred to by said recording/reading device is stored;
 wherein latest defect management information stored in said erasable non-volatile memory means corresponding to said writable disc currently in said recording/reading device is stored in said memory of said controller while said corresponding writable disc is in said recording/reading device:
 wherein said erasable non-volatile memory means is a floppy disc.

5. An autochanger of writable discs, comprising:
 a plurality of writable discs for storing data, wherein each of said writable discs has user areas for storing said data, replacement areas for storing said data in place of a defective sector in said user area, and map areas for storing defect management information, said defect management information including addresses of defective sectors in said writable disc and addresses of replacement sectors corresponding to said defective sectors;

a disc accommodation unit for accommodating in order said plurality of discs;

a recording/reading device for recording said data into one of said writable discs which is currently in said recording/reading device and reading recorded data from said writable disc by accessing prescribed addresses of said writable disc while referring to latest defect management information stored in a memory;

a loading mechanism for automatically transferring said writing discs between said disc accommodation unit and said recording/reading device;

erasable non-volatile memory for storing said latest defect management information of each of said plurality of writable discs, said stored latest defect management information being renewed when a new defective sector is found; and a controller for controlling said loading mechanism, said recording/reading device, and said erasable non-volatile memory means, said controller including said memory in which said latest defect management information referred to by said recording/reading device is stored;

wherein latest defect management information stored in said erasable non-volatile memory means corresponding to said writable disc currently in said recording/reading device is stored in said memory of said controller while said corresponding writable disc is in said recording/reading device;

wherein said erasable non-volatile memory means is a hard disc.

6. An autochanger of writable discs as claimed in claim 1, wherein each of said plurality of writable discs is a write-once optical disc.

7. An autochanger of writable discs as claimed in claim 1, wherein said plurality of writable discs includes write-once optical discs and erasable-rewritable optical disc.

8. An autochanger of writable discs, comprising:

a plurality of writable discs for storing data, wherein each of said writable discs has user areas for storing said data, replacement areas for storing said data in place of a defective sector in said user area, and map areas for storing defect management information, said defect management information including addresses of defective sectors in said writable disc and addresses of replacement sectors corresponding to said defective sectors;

a disc accommodation unit for accommodating in order said plurality of discs;

a recording/reading device for recording said data into one of said writable discs which is currently in said recording/reading device and reading recorded data from said writable disc by accessing prescribed addresses of said writable disc while referring to latest defect management information stored in a memory;

a loading mechanism for automatically transferring said writing discs between said disc accommodation unit and said recording/reading device;

erasable non-volatile memory for storing said latest defect management information of each of said plurality of writable discs, said stored latest defect management information being renewed when a new defective sector is found; and a controller for controlling said loading mechanism, said recording/reading device, and said erasable non-volatile memory means, said controller including said memory in which said latest defect management information referred to by said recording/reading device is stored;

wherein latest defect management information stored in said erasable non-volatile memory means corresponding to said writable disc currently in said recording/reading device is written into said memory of said controller while said loading mechanism transfers said writable disc from said disc accommodation unit to said recording/reading device, and is stored in said memory of said controller while said corresponding writable disc is in said recording/reading device.

* * * * *